(12) United States Patent
Kitazato et al.

(10) Patent No.: US 9,451,318 B2
(45) Date of Patent: Sep. 20, 2016

(54) RECEPTION APPARATUS, RECEPTION METHOD, TRANSMISSION APPARATUS, TRANSMISSION METHOD, AND PROGRAM

(71) Applicant: Sony Corporation, Tokyo (JP)

(72) Inventors: Naohisa Kitazato, Tokyo (JP); Jun Kitahara, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/390,250

(22) PCT Filed: Apr. 4, 2013

(86) PCT No.: PCT/JP2013/060359
§ 371 (c)(1),
(2) Date: Oct. 2, 2014

(87) PCT Pub. No.: WO2013/154023
PCT Pub. Date: Oct. 17, 2013

(65) Prior Publication Data
US 2015/0067752 A1    Mar. 5, 2015

(30) Foreign Application Priority Data

Apr. 12, 2012  (JP) .................. 2012-091252

(51) Int. Cl.
| | |
|---|---|
| H04N 7/173 | (2011.01) |
| H04N 21/434 | (2011.01) |
| H04N 21/236 | (2011.01) |
| H04N 21/2362 | (2011.01) |
| H04N 21/2368 | (2011.01) |
| H04N 21/488 | (2011.01) |
| H04N 21/81 | (2011.01) |
| H04N 21/235 | (2011.01) |
| H04N 21/435 | (2011.01) |
| H04N 21/462 | (2011.01) |

(52) U.S. Cl.
CPC ...... *H04N 21/4349* (2013.01); *H04N 21/2353* (2013.01); *H04N 21/2362* (2013.01); *H04N 21/2368* (2013.01); *H04N 21/23617* (2013.01); *H04N 21/435* (2013.01); *H04N 21/4345* (2013.01); *H04N 21/462* (2013.01); *H04N 21/488* (2013.01); *H04N 21/8173* (2013.01)

(58) Field of Classification Search
None
See application file for complete search history.

(56) References Cited

U.S. PATENT DOCUMENTS

| | | | |
|---|---|---|---|
| 8,688,457 B2 | 4/2014 | Dewa et al. | |
| 2006/0130114 A1* | 6/2006 | Kwon | H04N 7/163 725/118 |
| 2007/0250536 A1 | 10/2007 | Tanaka et al. | |
| 2012/0174170 A1 | 7/2012 | Dewa et al. | |

FOREIGN PATENT DOCUMENTS

| | | |
|---|---|---|
| JP | 2011-066556 A | 3/2011 |
| JP | 2011-091619 A | 5/2011 |
| JP | 2011-166441 A | 8/2011 |
| WO | 2006-022304 A1 | 3/2006 |
| WO | 2011-027504 A1 | 3/2011 |

OTHER PUBLICATIONS

International Search Report from International Publication PCT/JP2013/060359 mailed Jul. 2, 2013.

* cited by examiner

*Primary Examiner* — Nicholas Corbo
(74) *Attorney, Agent, or Firm* — Chip Law Group

(57) ABSTRACT

Provided is a reception apparatus including a reception unit that receives broadcast content transmitted by a broadcast waves of digital broadcasting, a first obtaining unit that obtains transmission data other than data-broadcast content, the transmission data being transmitted in a data carousel transmission scheme by the broadcast wave, and a control unit that controls a predetermined operation based on the obtained transmission data.

12 Claims, 14 Drawing Sheets

FIG. 8

| NAME | ESSENTIAL/OPTION | DESCRIPTION |
|---|---|---|
| APPLICATION TYPE | ESSENTIAL | APPLICATION TYPE. FIXED TO HTML 5. |
| PROVIDER ID | ESSENTIAL | APPLICATION PROVIDER ID. |
| APPLICATION ID | ESSENTIAL | APPLICATION IDENTIFIER UNIQUE IN PARTICULAR PROVIDER. |
| APPLICATION CONTROL COMMAND | ESSENTIAL | CONTROL ACTIONS WITH RESPECT TO TARGET APPLICATION.<br>・Auto-start　・kill<br>・Prefetch　・Present |
| APPLICATION SPECIFICATION VERSION | ESSENTIAL | VERSION NUMBER OF EACH APPLICATION TYPE. |
| RECEIVER-REQUEST-FUNCTION PROFILE | OPTION<br>(DEFAULT ASSUMABLE) | PROFILE VALUE INDICATING RECEIVER FUNCTION REQUESTED BY APPLICATION. IF MATCHED, IT IS DETERMINED THAT APPLICATION CAN BE UTILIZED. |
| APPLICATION URL | OPTION<br>(ESSENTIAL DEPENDING ON COMMAND) | APPLICATION OBTAINMENT SOURCE URL. |
| APPLICATION BOUNDARY | OPTION<br>(ESSENTIAL DEPENDING ON COMMAND) | OPERATION RANGE OF APPLICATION. |
| APPLICATION BROADCAST LINKED RANGE | OPTION<br>(ESSENTIAL DEPENDING ON COMMAND) | LINKED OPERATION RANGE OF APPLICATION.<br>Service_bound/Provider_bound/U-bound |
| APPLICATION PRIORITY | OPTION | PRIORITY AMONG APPLICATIONS. |
| SERVER-ACCESS DISPERSION PARAMETER | OPTION | CONTROL PARAMETER FOR DISPERSING SERVER ACCESS. |

FIG. 12

```
additional_default_ait_info_indicator        1
default_auto_start_priority_flag             1
non_default_ait_info_indicator               1
non_default_ait_info_number                  3
If(non_default_ait_info_indicator==0) {
    for(j=0;j<non_default_ait_number;j++) {
        additional_ait_info()                8
    }
}
```

```
additional_ait_info() {
    ait_identifier_info()                   16
    application_type                         1
    transport_type                           2
    auto_start_priority                      2
    AIT_version_number                       5
}
```

PMT

DATA ES DESCRIPTION REGION

DATA-ENCODING-SCHEME DESCRIPTOR reserved_for_future_use    6

RECEPTION APPARATUS, RECEPTION METHOD, TRANSMISSION APPARATUS, TRANSMISSION METHOD, AND PROGRAM

CROSS-REFERENCE TO RELATED APPLICATION

The present application is a national phase entry under 35 U.S.C. §371 of International Application No. PCT/JP2013/060359 filed Apr. 4, 2013, published on Oct. 17, 2013 as WO 2013/154023 A1, which claims priority from Japanese Patent Application No. JP 2012-091252, filed in the Japanese Patent Office on Apr. 12, 2012.

TECHNICAL FIELD

The present invention relates to a reception apparatus, a reception method, a transmission apparatus, a transmission method, and a program and particularly relates to a reception apparatus, a reception method, a transmission apparatus, a transmission method, and a program configured to be able to transmit various data by broadcast waves of digital broadcasting.

BACKGROUND ART

Recently, along with initiation of digital broadcasting, data broadcasting in a BML (Broadcast Markup Language) scheme has been widely carried out. In data broadcasting, data is transmitted in a data carousel transmission scheme of transmitting data in information transmission units referred to as modules. In the data carousel transmission scheme, transmission can be repeatedly carried out in the units referred to as a data carousel which is gathering of some modules, and a receiver can display data broadcasting such as news and weather forecasts at any time.

The present applicant has proposed a technique of superimposing and displaying the images of a sign language on the images of content by multiplexing and transmitting the modules of the data carousel storing sign-language word images (for example, see Patent Literature 1).

CITATION LIST

Patent Literature

Patent Literature 1: JP 2011-91619A

SUMMARY OF INVENTION

Technical Problem

Incidentally, depending on the mode of the operation of the digital broadcasting, various data used for the purposes other than existing data broadcasting is required to be transmitted by broadcast waves. Particularly, introduction of broadcasting referred to as hybrid-type broadcasting utilizing communication in addition to broadcast waves has been studied. However, in order to link the broadcasting and communication thereof, transmitting of control information for controlling the linkage by the broadcast waves is also expected.

However, currently, a technical scheme for transmitting various data by the broadcast waves of the digital broadcasting has not been established.

The present techniques have been accomplished in view of such circumstances and enable transmission of various data by the broadcast waves of the digital broadcasting by utilizing the data carousel transmission scheme.

Solution to Problem

A reception apparatus according to a first aspect of the present technology includes a reception unit that receives broadcast content transmitted by a broadcast waves of digital broadcasting, a first obtaining unit that obtains transmission data other than data-broadcast content, the transmission data being transmitted in a data carousel transmission scheme by the broadcast wave, and a control unit that controls a predetermined operation based on the obtained transmission data.

The transmission data is control information for controlling an operation of an application program executed in conjunction with the broadcast content. The control unit controls the operation of the application program distributed via a network in accordance with the control information.

The reception apparatus further includes a second obtaining unit that obtains identification information on a module for transmitting the control information, the identification information being described in an additional data descriptor different from a data-encoding-scheme descriptor in a data elementary stream description region of a PMT (Program Map Table) transmitted by the broadcast wave. The first obtaining unit obtains the control information from the module identified by the obtained identification information.

Information indicating a type of the transmission data is described in the additional data descriptor.

When the control information is specified as the type, the control unit controls the operation of the application program in accordance with set content described in the additional data descriptor.

When the control information is specified as the type, information indicating a transmission scheme of the control information is described as additional information in the additional data descriptor.

When the control information is specified as the type, information indicating priority of activation between the application program and the data-broadcast content is described as additional information in the additional data descriptor.

The first obtaining unit obtains identification information on a module for transmitting the control information obtained from a DII (Download Info Indication) storing directory information on a DDB (Download Data Block) in the data carousel transmission scheme, and obtains the control information from the module identified by the obtained identification information.

When the control information specified as default and described in a reserve region of a data-encoding-scheme descriptor in a data elementary stream description region of a PMT (Program Map Table) transmitted by the broadcast wave is transmitted, the control unit controls the operation of the application program in accordance with set content determined in advance.

When the control information specified as the default is not transmitted, information indicating a transmission scheme of the control information is described as additional information in the reserve region.

When the control information specified as the default is not transmitted, information indicating priority of activation between the application program and the data-broadcast content is described as additional information in the reserve region.

The reception apparatus may be an independent apparatus or an internal block constituting one apparatus.

The reception method or program of a first aspect of the present techniques is a reception method or program corresponding to the reception apparatus of the above-described first aspect of the present techniques.

In the reception apparatus, reception method, and program of the first aspect of the present techniques, the broadcast content transmitted by the broadcast waves of the digital broadcasting are received, the transmission data that is transmitted in the data carousel transmission scheme by the broadcast waves and is other than the data-broadcast content is obtained, and the predetermined operation is controlled based on the obtained transmission data.

A transmission apparatus of a second aspect of the present techniques is provided with a first transmission unit that transmits the broadcast content transmitted by the broadcast waves of the digital broadcasting and a second transmission unit that transmits the transmission data that is transmitted in the data carousel transmission scheme by the broadcast waves and is other than the data-broadcast content.

A transmission method of the second aspect of the present techniques is a transmission method corresponding to the transmission apparatus of the above-described second aspect of the present techniques.

In the transmission apparatus and the transmission method of the second aspect of the present techniques, the broadcast content transmitted by the broadcast waves of the digital broadcasting are transmitted, and the transmission data that is transmitted in the data carousel transmission scheme by the broadcast waves and is other than the data-broadcast content is transmitted.

Advantageous Effects of Invention

According to the first aspect and the second aspect of the present techniques, various data can be transmitted by the broadcast waves of the digital broadcasting.

BRIEF DESCRIPTION OF DRAWINGS

FIG. 8 is a drawing showing description content of application control information.

FIG. 12 is a drawing showing a description example of a PMT according to a second scheme.

DESCRIPTION OF EMBODIMENTS

Hereinafter, an embodiment of the present techniques will be explained with reference to drawings.

[Configuration Example of Broadcasting System]

Figure 1:
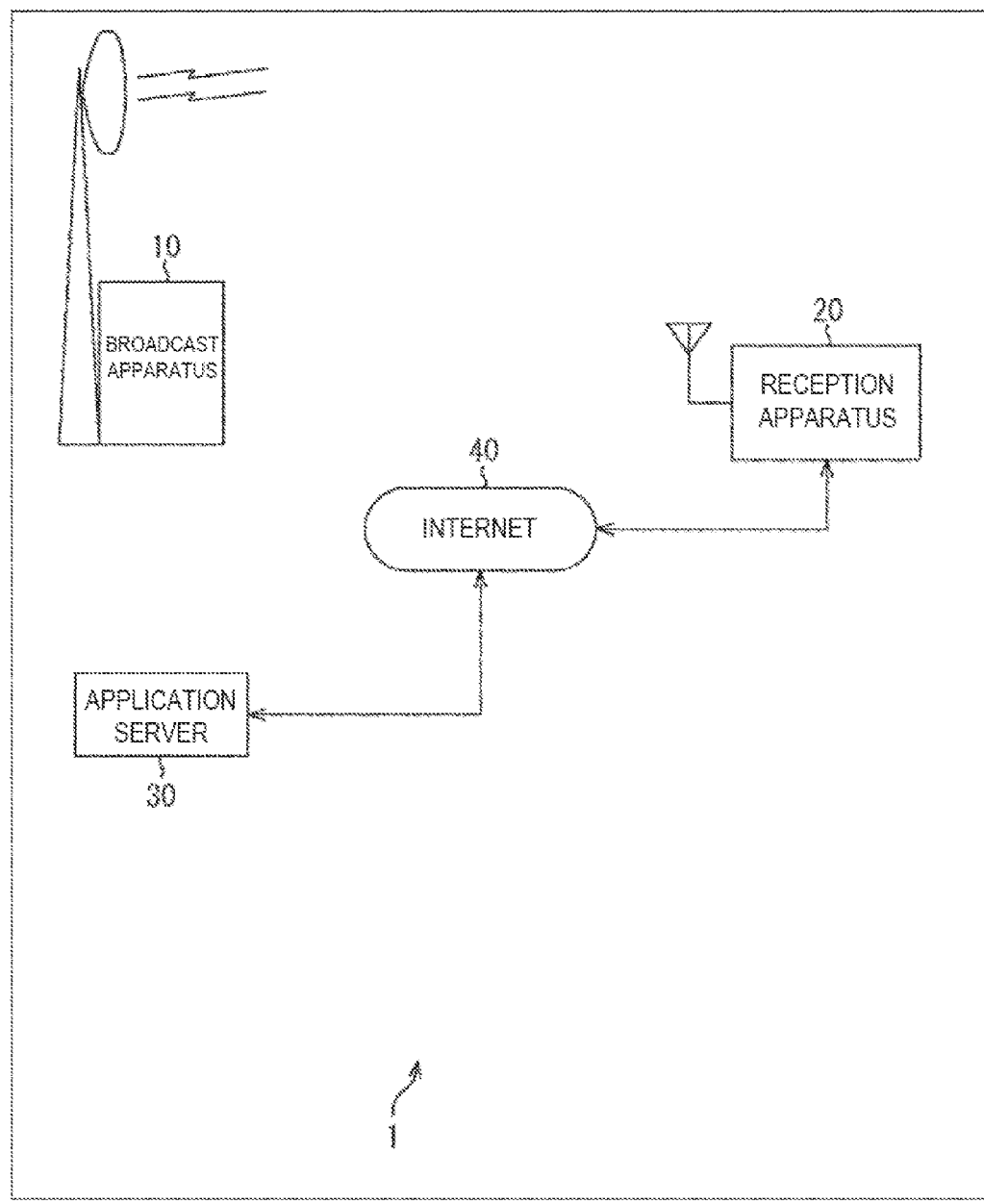
FIG. 1 is a drawing showing a configuration of an embodiment of a broadcast system to which the present techniques are applied.

FIG. 1 is a drawing showing a configuration of an embodiment of a broadcast system to which the present techniques are applied.

A broadcast system 1 consists of a broadcast apparatus 10, a reception apparatus 20, and an application server 30. Moreover, the reception apparatus 20 and the application server 30 are mutually connected via the Internet 40.

The broadcast apparatus 10 is configured to transmit broadcast signals of broadcast content such as TV programs and commercials by broadcast waves of digital broadcasting.

The reception apparatus 20 receives the broadcast signals, which are transmitted from the broadcast apparatus 10 by the broadcast waves of the digital broadcasting, and obtains images and sounds of the broadcast content. The reception apparatus 20 outputs the obtained images to a display and outputs the sounds to a speaker.

Note that the reception apparatus 20 may be present as a single apparatus or may be configured to be built in, for example, a television receiver or a video recorder. A detailed configuration of the reception apparatus 20 will be described later with reference to FIG. 2.

The broadcast apparatus 10 puts application control information, which is for controlling the operation of a linked application(s), in the broadcast signals and transmits them.

Herein, the linked application is an application program executed in conjunction with the broadcast content such as TV programs and is distributed by the application server 30, which is connected to the Internet 40.

Moreover, the application control information is transmitted by the broadcast waves of the digital broadcasting by utilizing a data carousel transmission scheme. Thus, the data carousel transmission scheme is also used for transmitting the application control information in the present embodiment, while the data carousel transmission scheme is a transmission scheme which is used in data broadcasting as described above.

In the application control information, "Auto Start", "Present", "Kill", "Prefetch", etc. are described as control commands for controlling the operation of the linked application.

"Auto Start" is a command with which the reception apparatus 20 automatically instantly executes the linked application. On the other hand, "Present" is a command for showing whether the linked application is executable in a case in which the linked application is executed at arbitrary timing in response to a request from the outside instead of automatically executing the linked application.

"Kill" is a command for causing the reception apparatus 20 to terminate execution of the linked application. Furthermore, "Prefetch" is a command for obtaining the linked application in advance.

Moreover, in the application control information, a URL (Uniform Resource Locator) of the application server 30 is described as the information on an obtainment source of the linked application.

Based on the application control information, the reception apparatus 20, for example, obtains and executes a linked application which is set so as to be automatically instantly executed. In that process, the reception apparatus 20 accesses the application server 30 via the Internet 40 in accordance with the URL described in the application control information and obtains the linked application.

The application server 30 manages the linked applications. The application server 30 is provided by, for example, a broadcasting provider or the like which broadcasts the broadcast content by the broadcast apparatus 10.

In response to an inquiry from the reception apparatus 20, the application server 30 distributes the linked application, which is managed thereby, to the reception apparatus 20 via the Internet 40.

The broadcast system 1 is configured in the above manner.

[Configuration Example of Reception Apparatus]

Figure 2:
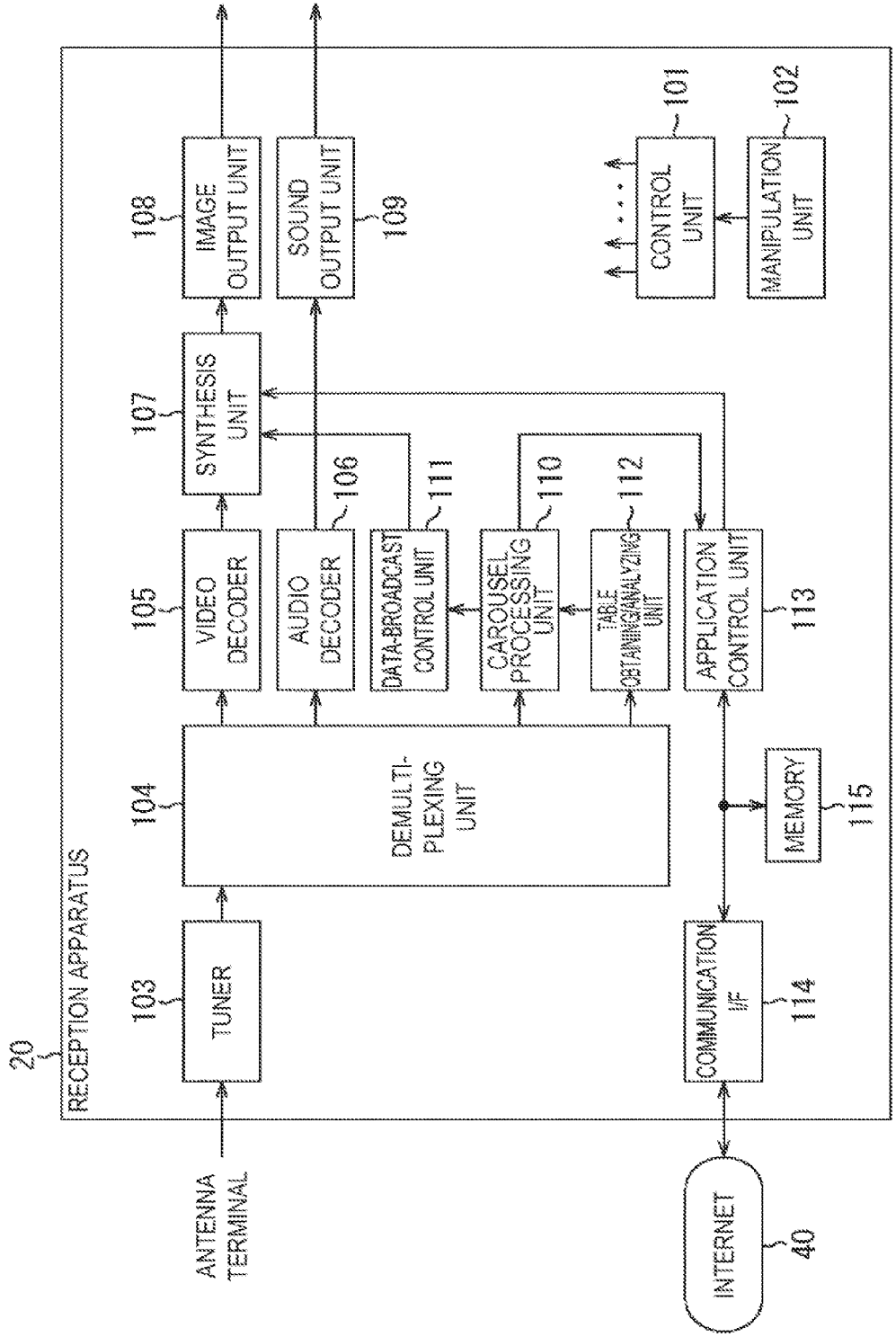
FIG. 2 is a drawing showing a configuration of an embodiment of a reception apparatus to which the present techniques are applied.

FIG. 2 is a drawing showing a configuration of an embodiment of the reception apparatus to which the present techniques are applied.

The reception apparatus 20 consists of a control unit 101, a manipulation unit 102, a tuner 103, a demultiplexing unit 104, a video decoder 105, an audio decoder 106, a synthesis unit 107, an image output unit 108, a sound output unit 109, a carousel processing unit 110, a data-broadcast control unit 111, a table obtaining/analyzing unit 112, an application control unit 113, a communication I/F 114, and a memory 115.

The control unit 101 controls the operation of the units of the reception apparatus 20.

The manipulation unit 102 supplies manipulation signals, which correspond to manipulations by users, to the control unit 101. In response to the manipulation signals from the manipulation unit 102, the control unit 101 controls the operation of the units of the reception apparatus 20.

The tuner 103 receives and demodulates the broadcast signals corresponding to a selected channel and supplies a transport stream, which is obtained as a result thereof, to the demultiplexing unit 104.

The demultiplexing unit 104 separates the transport stream, which is supplied from the tuner 103, into a video elementary stream, an audio elementary stream, and a data elementary stream. The demultiplexing unit 104 supplies, among the separated streams, the video elementary stream to the video decoder 105, supplies the audio elementary stream to the audio decoder 106, and supplies the data elementary stream to the carousel processing unit 110.

Note that, in the transport stream, a stream for control information, etc. are multiplexed in addition to the above-described streams. In a case of MPEG2-TS (Moving Picture Experts Group 2—Transport Stream), the stream for the control information contains information on PSI/SI, etc.

PSI (Program Specific Information) is the information required in a system which selects and receives a particular channel. PSI contains a PMT. PMT (Program Map Table) stores PIDs (Packet IDs) of images, sounds, etc. contained in a certain program. SI (Service Information) is information such as program information and contains, for example, an EIT. The EIT (Event Information Table) contains information about a program such as the name, broadcast time and date, broadcast content, etc. of the program.

The video decoder 105 decodes the video elementary stream, which is supplied from the demultiplexing unit 104, and supplies image signals obtained as a result thereof to the synthesis unit 107. The synthesis unit 107 supplies the image signals, which are supplied from the video decoder 105, to the image output unit 108.

The image output unit 108 outputs the image signals, which are supplied from the synthesis unit 107, to an external display (not shown). As a result, the display displays images of a TV program or the like.

The audio decoder 106 decodes the audio elementary stream, which is supplied from the demultiplexing unit 104, and supplies sound signals obtained as a result thereof to the sound output unit 109.

The sound output unit 109 outputs the sound signals, which are supplied from the audio decoder 106, to an external speaker (not shown). As a result, the sounds corresponding to the images of the TV program or the like are output from the speaker.

The carousel processing unit 110 extracts the data of content for data broadcast (hereinafter, referred to as data-broadcast content) from the data elementary stream, which is supplied from the demultiplexing unit 104 and supplies the data to the data-broadcast control unit 111. Note that, although details will be described later, the data of the data-broadcast content is transmitted by respective data-constituting objects referred to as modules in the data carousel transmission scheme.

The data-broadcast control unit 111 controls the operation of the data-broadcast content, which are supplied from the carousel processing unit 110. For example, if the data-broadcast content consists of BML-form documents, the data-broadcast control unit 111 supplies image signals corresponding to the data-broadcast content to the synthesis unit 107 by controlling a BML browser.

The image signals from the video decoder 105 and the image signals from the data-broadcast control unit 111 are supplied to the synthesis unit 107. The synthesis unit 107 synthesizes the image signals of the TV program or the like and the image signals of the data-broadcast content and supplies them to the image output unit 108. As a result, for example, images in which the information on data broadcast such as weather forecasts is superimposed on a TV program are displayed on the display.

The table obtaining/analyzing unit 112 always monitors the stream for the control information separated from the demultiplexing unit 104 and obtains the PMT. The table obtaining/analyzing unit 112 analyzes the obtained PMT and supplies the analysis result thereof to the carousel processing unit 110.

The carousel processing unit 110 extracts the application control information from the data elementary stream, which is supplied from the demultiplexing unit 104, based on the analysis result, etc. supplied from the table obtaining/analyzing unit 112 and supplies the application control information to the application control unit 113. Note that, although details will be described later, the application control information is transmitted by respective data-constituting objects referred to as modules in the data carousel transmission scheme.

The application control unit 113 controls the operation of the linked application based on the application control information, which is supplied from the carousel processing unit 110.

In accordance with the control from the application control unit 113, the communication I/F 114 accesses the application server 30 via the Internet 40 and requests the linked application. The communication I/F 114 receives the linked application, which is distributed from the application server 30, and stores the linked application in the memory 115.

Based on the application control information, the application control unit 113 reads the linked application, which is stored in the memory 115, and controls the operation thereof. For example, if the linked application consists of HTML5 (Hyper Text Markup Language 5) format documents, the application control unit 113 supplies the image signals, which correspond to the linked application, to the synthesis unit 107, by controlling a HTML browser.

The image signals from the video decoder 105 and the image signals from the application control unit 113 are supplied to the synthesis unit 107. The synthesis unit 107 synthesizes the image signals of the TV program or the like and the image signals of the linked application and supplies them to the image output unit 108. As a result, the images in which the linked application is superimposed on the TV program are displayed on the display.

Note that, in the configuration example of FIG. 2, it has been explained that the image signals and the sound signals are output to the outside. However, if the reception apparatus 20 is constituted as a television receiver, the signals are configured to be respectively supplied to a display and a speaker built therein.

The reception apparatus 20 is configured in the above manner.

[Outline of Data Carousel Transmission Scheme]

In the present embodiment, by using the data carousel transmission scheme, data such as the data-broadcast content and application control information (hereinafter, the data transmitted in the data carousel transmission scheme will be referred to as transmission data) is transmitted. Therefore, next, the transmission data transmitted in the data carousel transmission scheme will be explained with reference to FIG. 3 to FIG. 5.

Figure 3:
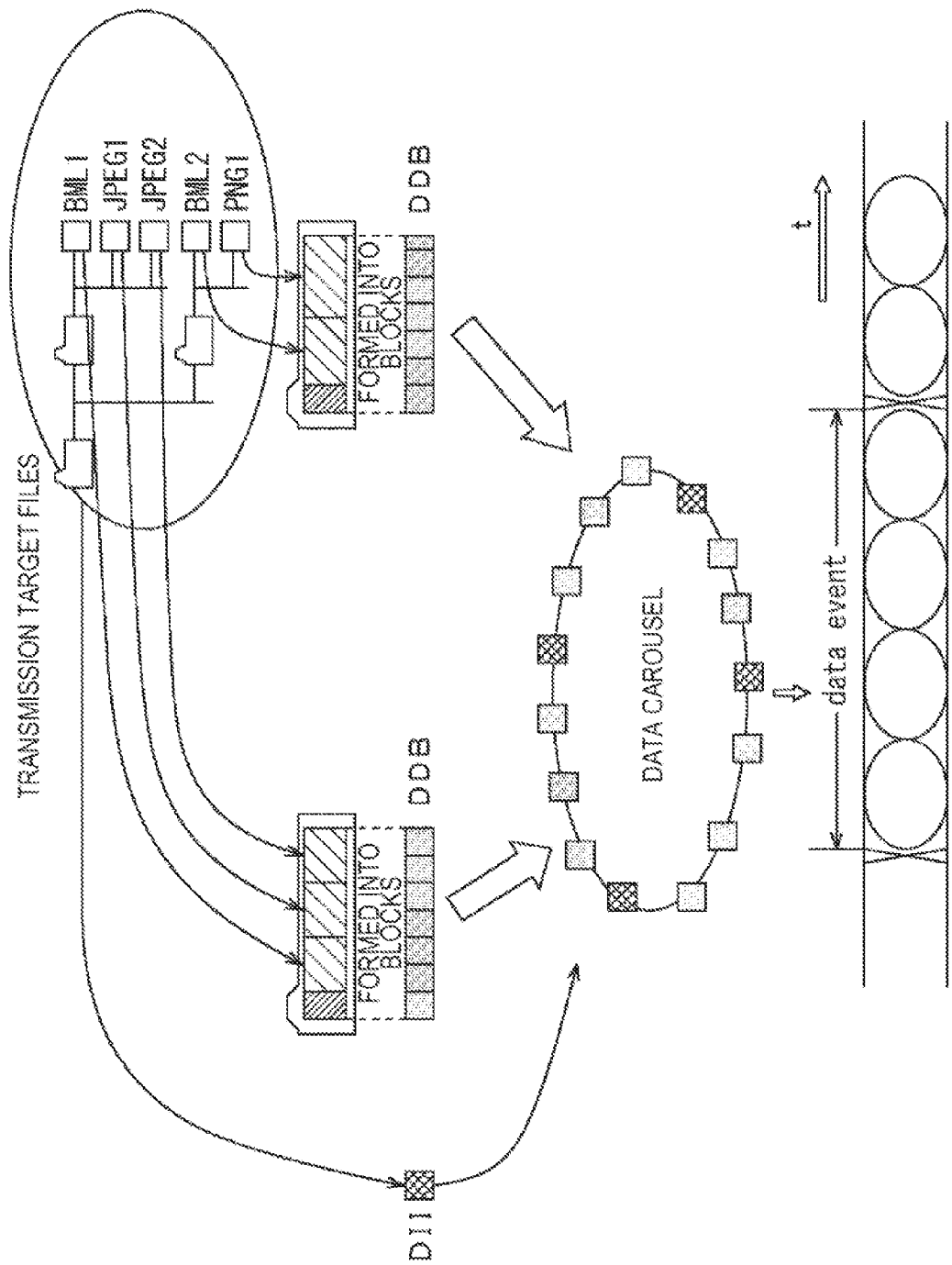
FIG. 3 is a drawing explaining an outline of transmission of transmission data in a data carousel transmission scheme.

FIG. 3 is a drawing for explaining an outline of data transmission in the data carousel transmission scheme. Note that, herein, a case in which data-broadcast content is transmitted as the transmission data is explained as an example.

As shown in FIG. 3, the data-broadcast content consists of BML files and clusters such as image files of JPEG (Joint Photographic Experts Group) and PNG (Portable Network Graphics) and are managed in folder units, in which the files are stored in a directory configuration. When the data-broadcast content is transmitted in the data carousel transmission scheme, the files serving as a transmission target is formed into multipart in virtual folder units.

Moreover, in the data carousel transmission scheme, two types of messages, which are DDB (Download Data Block) containing actual data of the data-broadcast content and DII (Download Info Indication) storing directory information on the DDB, are mainly utilized.

DDBs correspond to respective blocks of the modules, and block numbers are allocated thereto. The reception apparatus 20 rearranges obtained data blocks in the order of the block numbers, thereby rebuilding the modules. DIIs represent the index information on the transmission targets in a data carousel. Moreover, the information about a plurality of modules can be described by a single DII. When the DII is received, the reception apparatus 20 recognizes the configurations of the modules.

Since the modules formed into blocks are cyclically transmitted in the data carousel transmission scheme as conceptually shown in FIG. 3, the reception apparatus 20 obtains DDBs based on a DII and rebuilds the target modules. Note that, although the transmission order of the DDBs and the DII is arbitrary, the DII is transmitted at a comparatively high frequency since the DII stores the data corresponding to the index information.

Figure 4:
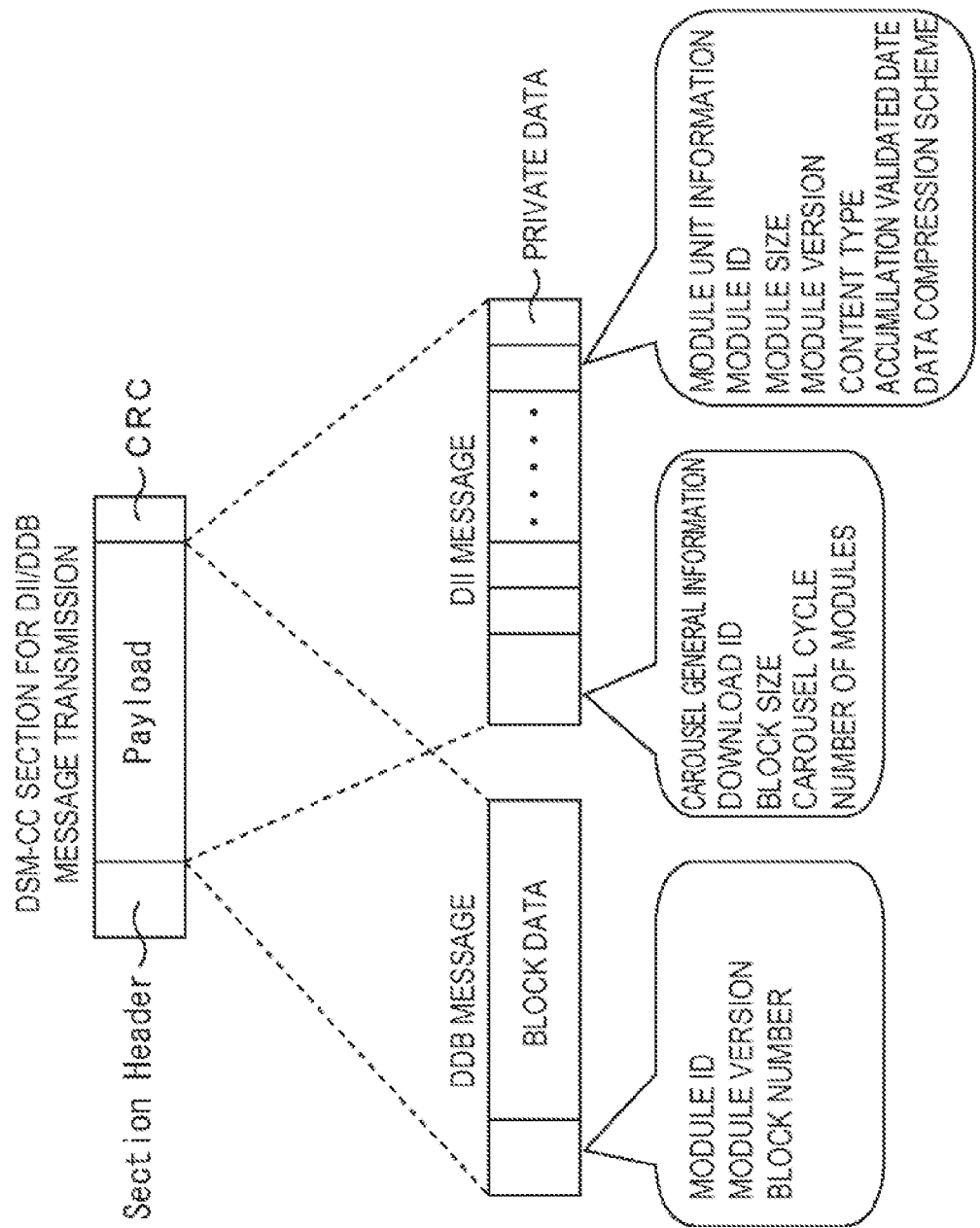
FIG. 4 is a drawing showing a structure of a DSM-CC section.

FIG. 4 is a drawing showing the structure of a DSM-CC section for message transmission of DDB or DII.

As shown in the upper part of FIG. 4, the DSM-CC section consists of a section header, a payload part, and a CRC part. The above-described blocks of the module are stored in the payload part. The section header stores table identification information, a section length, table identification expansion, version information, etc. and section information.

In the table identification information, the information indicating that whether this section is a DDB message or a DII message is described. The section length indicates the size of the section excluding the fields of the table identification information and the section length per se. The table identification expansion, the version information, etc. have different meanings depending on the value of the table identification information. In the section information, a section number and a last section number are stored.

The CRC part is a check code for verifying whether TS packets constituting the section have been orderly correctly collected or not and is used for an error correcting process by cyclic redundancy check (Cyclic Redundancy Check).

Also, in the lower part of FIG. 4, the structures of a DDB message and a DII message are shown.

If this section is a DDB message, the payload part consists of block data and the information indicating a module ID, a module version, and a block number.

As the module ID, the identification information on the module contained in this DDB is described. As the module version, the version information on the module contained in this DDB is described. Also, as the block number, the number of each block of the module contained in this DDB is described.

If this section is a DII message, the payload part consists of carousel general information which is the information about general transmission in the data carousel transmission scheme, module unit information which is the information on modules, and private data.

This carousel general information contains a download ID, a block size, a carousel cycle, and the number of modules. As the download ID, the identification information on download by this DII is described. As the block size, the size of each block is described. Meanwhile, as the carousel cycle, the cycle of transmission is described. As the number of modules, the number of the modules to be transmitted is described.

Meanwhile, this module unit information contains a module ID, a module size, a module version, a content type, an accumulation validated date, and a data compression scheme as information for each module. As the module ID, the identification information on the module to be transmitted by DDB is described. As the module size, the size of the module to be transmitted by DDB is described. As the module version, the version information on the module to be transmitted by DDB is described. As the content type, the accumulation validated date, and the data compression scheme, the type of the file, an accumulation time limit, and a data compression scheme are described, respectively.

The private data contains, for example, a pullback flag.

In the broadcast apparatus 10, this section is further divided, stored in a plurality of continuous TS packets, and transmitted. Moreover, in the data carousel transmission scheme, data-broadcast content is cyclically transmitted in block (section) units. On the other hand, the reception apparatus 20 receives the TS packets, restores the section by using these TS packets, and rebuilds the original module by using the restored section. Then, in the reception apparatus 20, the data-broadcast content is restored based on the module identified by the module ID.

Figure 5:
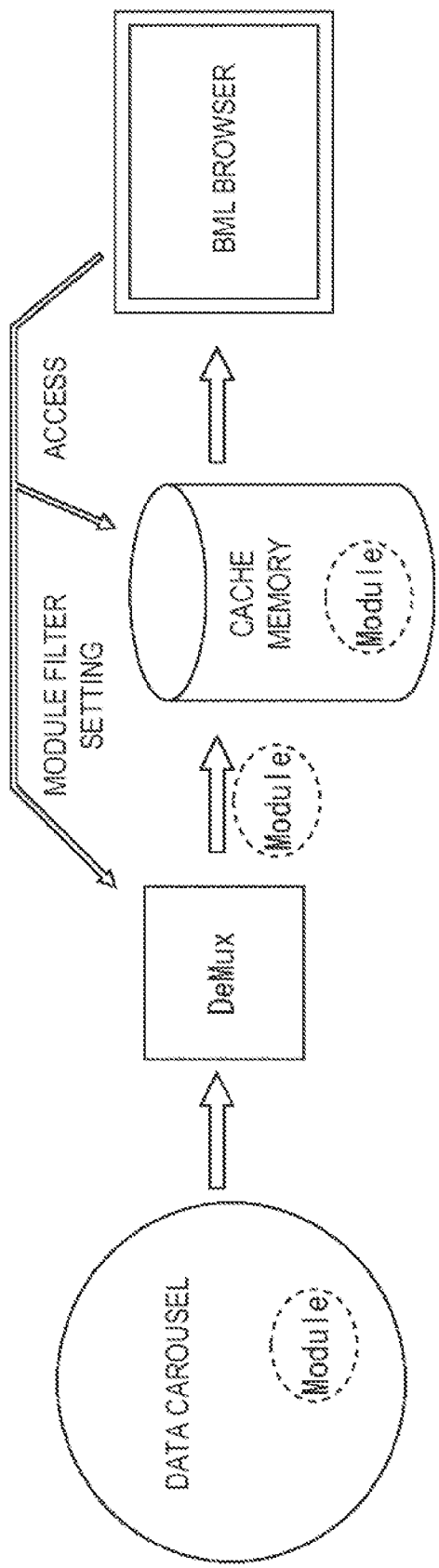
FIG. 5 is a drawing explaining a reception operation of the reception apparatus in the data carousel transmission scheme.

Specifically, the operation shown in FIG. 5 is carried out in the reception apparatus 20. Specifically, if the data-broadcast content is to be displayed by a BML browser, the data-broadcast control unit 111 carries out filter setting with respect to the demultiplexing unit 104 so that a DDB message specifying "0" as a module ID is obtained. More specifically, since a BML-form document to be displayed first is transmitted by a module having a module ID which is "0", upon activation of the data-broadcast content, the module having the module ID which is "0" has to be rebuilt, and such module filter setting is carried out. Note that the module ID which is "0" is specified by the DII message or information set in advance.

In accordance with the module filter setting, the demultiplexing unit 104 rebuilds the module from the DDB message of the module ID which is "0" and stores it in a cache memory. Note that the cache memory has, as the size thereof, at least a size that is an integral multiple of the size of the module and can store data in module units. The data-broadcast control unit 111 accesses the cache memory, reads the module having the module ID which is "0", restores the BML-form document which is to be displayed first, and displays the document by the BML browser. As a result, the BML browser displays a top page of the data-broadcast content.

Then, if a transition to another BML-form document is to be made, similarly, module filter setting is carried out so that the module of the module ID for transmitting the BML-form document at the transition destination is obtained, the module of the corresponding module ID is obtained, and the BML-form document at the transition destination is restored.

Hereinabove, the outline of the data carousel transmission scheme has been explained.

[Specific Operation Example]

Incidentally, in the present embodiment, as the transmission data, the application control information is transmitted in addition to the data-broadcast content. In the reception apparatus 20, based on the transmitted application control information, the operation of the linked application is controlled. Therefore, next, a specific operation example for providing the linked application will be explained with reference to FIG. 6 to FIG. 13.

(Outline of Operation Example)

Figure 6:
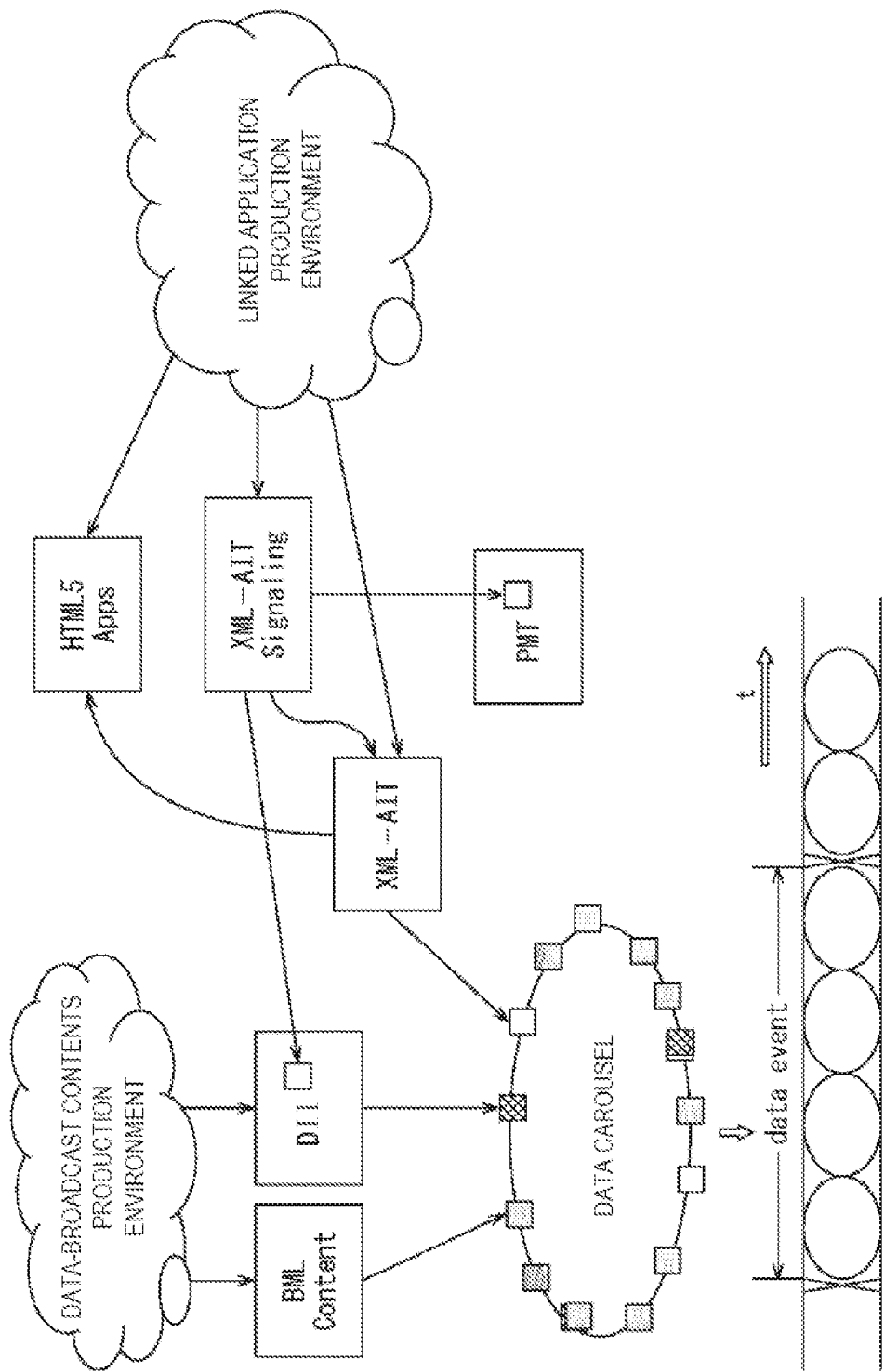
FIG. 6 is a drawing explaining an outline of a specific operation example.

FIG. 6 is a drawing for explaining an outline of a specific operation example.

As shown in FIG. 6, when data-broadcast content and application control information are transmitted in the data carousel transmission scheme, both of the data-broadcast content and a linked application can be operated in the reception apparatus 20. The data-broadcast content and the linked application are produced in different production environments and provided.

Therefore, the data-broadcast content produced in the production environment of the data-broadcast content is cyclically transmitted in the data carousel transmission scheme by DDBs and DIIs in the above-described manner. The reception apparatus 20 obtains the DDBs based on the DII and rebuilds target modules, thereby operating the data-broadcast content (in FIG. 6, described as "BML Content").

On the other hand, in a case of the linked application produced in the production environment of the linked application, the application control information for controlling the operation of the linked application is cyclically transmitted by DDBs in the data carousel transmission scheme. The reception apparatus 20 obtains the DDBs based on PMT or DII and rebuilds target modules, thereby obtaining the application control information.

Herein, this is the application control information transmitted by a predetermined module and is obtained by specifying, for PMT or DII, the module ID of the module for transmitting the application control information. More specifically, the reception apparatus 20 obtains the application control information by referencing the PMT or DII and rebuilding the module of the specified module ID. Then, the reception apparatus 20 operates the linked application based on the obtained application control information.

Note that, in FIG. 6, the linked application is described as "HTML 5 Apps" since it is a HTML 5 form document. Moreover, the application control information is, for example, described and provided in AIT (Application Information Table). However, in the case of the example of FIG. 6, AIT is described as "XML-AIT" since it is provided as an XML (Extensible Markup Language) form document. The information for obtaining this "XML-AIT" is described in the PMT or DII.

(Operation Sequence)

Next, an operation sequence of the reception apparatus 20 will be explained with reference to FIG. 7. Note that, FIG. 7 explains an example in which module ID of the module which transmits the application control information is obtained from a PMT.

Figure 7:
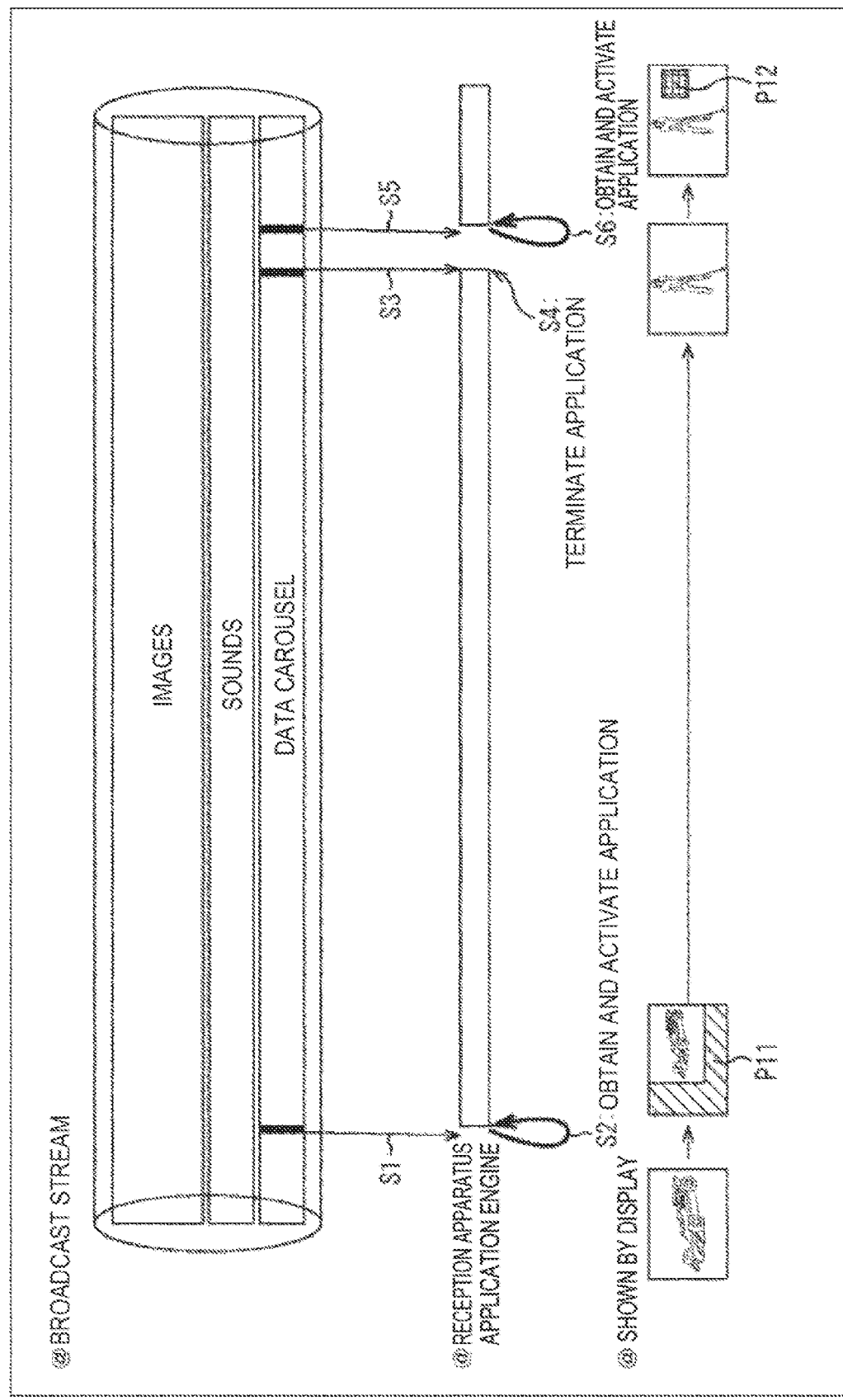
FIG. 7 is a drawing explaining an operation sequence of the reception apparatus.

As shown in FIG. 7, a broadcast stream is multiplexed with a video elementary stream, an audio elementary stream, and a stream for control information and is broadcasted. Moreover, a data elementary stream is transmitted in the data carousel transmission scheme.

When the PMT is received, for example, at the timing of selection of a TV program, the reception apparatus 20 retains the received PMT. The reception apparatus 20 obtains the application control information contained in AIT transmitted by the module of the module ID specified by the PMT (S1).

If the control command contained in the application control information specifies Auto Start, the reception apparatus 20 obtains and activates the linked application from the application server 30 via the Internet 40 (S2). As a result, the display displays an image in which an image P11 of the linked application is superimposed on the image of the TV program.

Then, if the module version of the module of the module ID specified by the PMT is changed, the reception apparatus 20 obtains the application control information contained in the AIT transmitted by the module (S3).

If the control command contained in the application control information specifies Kill, the reception apparatus 20 terminates the linked application, which is being operated (S4). As a result, as for display on the display, the image P11 of the linked application displayed superimposed on the image of the TV program is terminated, and an image of only this program is displayed.

Moreover, if the module version of the module of the module ID specified by the PMT is further changed, the reception apparatus 20 obtains the application control information contained in the AIT transmitted by the module (S5).

If the control command contained in the application control information specifies Auto Start, the reception apparatus 20 obtains the linked application from the application server 30 via the Internet 40 and activates it (S6). As a result, the display displays the image in which an image P12 of the linked application is superimposed on the image of the TV program.

In the above-described manner, in the reception apparatus 20, the module of the module ID specified by the PMT is always monitored, the application control information is obtained when the module version of the module is changed, and the operation corresponding to the control command contained in the application control information is carried out.

(Application Control Information)

Next, details of the application control information will be explained with reference to FIG. 8. In the application control information, for example, items shown in FIG. 8 are described.

As an application type, the type of the linked application is described. As this type, for example, HTML 5 is fixedly specified.

As a provider ID, the identification information on a provider that provides the linked application is described.

As an application ID, the identification information on the linked application which is unique in a particular provider is described. Thus, the application ID enables unique identification of the linked application when used in combination with the above-described provider ID.

As application control commands, control actions for the target linked application are described. As the control commands, specified operations such as "Auto Start", "Present", "Kill", and "Prefetch" are described.

As an application specification version, version information on each application type described above is described.

As a receiver-request-function profile, a profile value indicating a function that is requested from the linked application to the reception apparatus 20 is described. Therefore, if the reception apparatus 20 has the function described by this profile value, the reception apparatus 20 determines that the linked application can be utilized.

As an application URL, an obtainment source URL of the linked application is described.

As an application boundary, an operation range of the linked application is described. This operation range is specified by boundary information.

For example, as the boundary information, a particular domain is specified as the operation range of the linked application, and the operation of the linked application is allowed within the range of this domain. However, the domain of the obtainment source URL of the linked application described as the above-described application URL may serve as the boundary information.

As an application broadcast linked range, a linked operation range of the linked application is described. This linked operation range is specified as a bind type.

For example, if service bound (Service_bound) is specified as the bind type, the linked application is linked and operated in a predetermined service. If provider bound (Provider_bound) is specified, the linked application is linked and operated in the same broadcasting provider. If unbound (U-bound) is specified, the linked application is linked and operated without limitation.

As application priority, priority in the same application type is described. For example, as the application priority, the value indicating which application program is prioritized among application programs of HTML 5 form documents is specified.

As a server-access dispersion parameter, a control parameter for dispersing access to the application server 30 by dispersing the application timing of commands is described.

Note that, in the application control information, the application type, the provider ID, the application ID, the application control command, and the application specification version are essential items. Meanwhile, the receiver-request-function profile, the application URL, the application boundary, and the application broadcast linked range are option items with conditions. Furthermore, the application priority and the server-access dispersion parameter are completely option items.

Hereinabove, details of the application control information have been explained.

(Structure of PMT)

Figure 9:
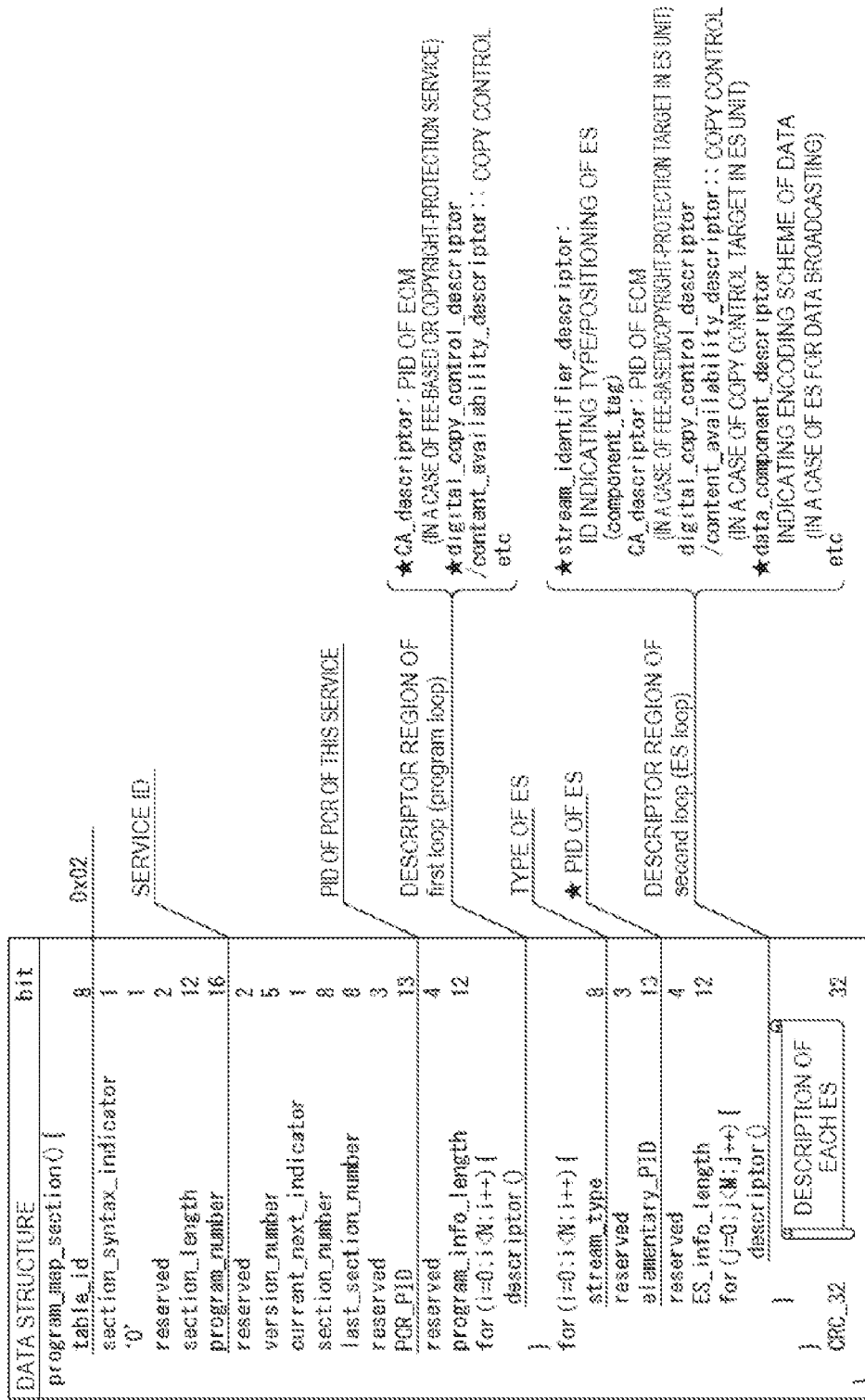
FIG. 9 is a drawing showing a structure of a PMT.

Next, with reference to FIG. 9, details of the PMT will be explained. FIG. 9 is a drawing showing the structure of the PMT.

As table_id, identification information on the PMT is described. As section_syntax_indicator, "1" is described.

As section_length, the section length of the PMT is described. As program_number, service_id of this service is described.

As version_number, version information is described. As current_next_indicator, "1" is described. As section_number, "0x00" is described. As last_section_number, "0x00" is described.

As PCR_PID, a PID of PCR of this service is described. As program_info_length, the loop length of a first loop is described. As descriptor( ) in this first loop, CA_descriptor which is a descriptor used in a fee-based/copyright-protection service, digital_copy_control_descriptor which is a descriptor used in copy control, content_availability_descriptor, etc. are described.

In a second loop, stream_type, elementary_PID, and ES_info_length are described. As stream_type, stream form identification of the target is described. As elementary_PID, a PID of a TS packet which transmits a related elementary stream or payload is described. As ES_info_length, the length of ES descriptor subsequent thereto is described.

As descriptor( ) in this second loop, CA_descriptor used in a fee-based/copyright-protection service in an elementary stream unit, digital_copy_control_descriptor used in copy control in an elementary stream unit, content_availability_descriptor, etc. are described. Furthermore, as a data-encoding-scheme descriptor, data_component_descriptor is described.

The PMT consists of the above-described structure.

Incidentally, the module ID of the module for transmitting the application control information is specified by the PMT or DII, and there are two methods below as the method of describing the PMT for providing the application control information. That is, first, a method of adding and defining a new descriptor without changing the description content of the data-encoding-scheme descriptor described as "descriptor" in the second loop of the above-described PMT and, secondly, a method of utilizing a reserve region in the data-encoding-scheme descriptor.

Hereinafter, the former one will be referred to as a first scheme, and the latter one will be referred to as a second scheme to give an explanation.

(First Scheme)

First, the first scheme will be explained with reference to FIG. 10 and FIG. 11.

Figure 10:
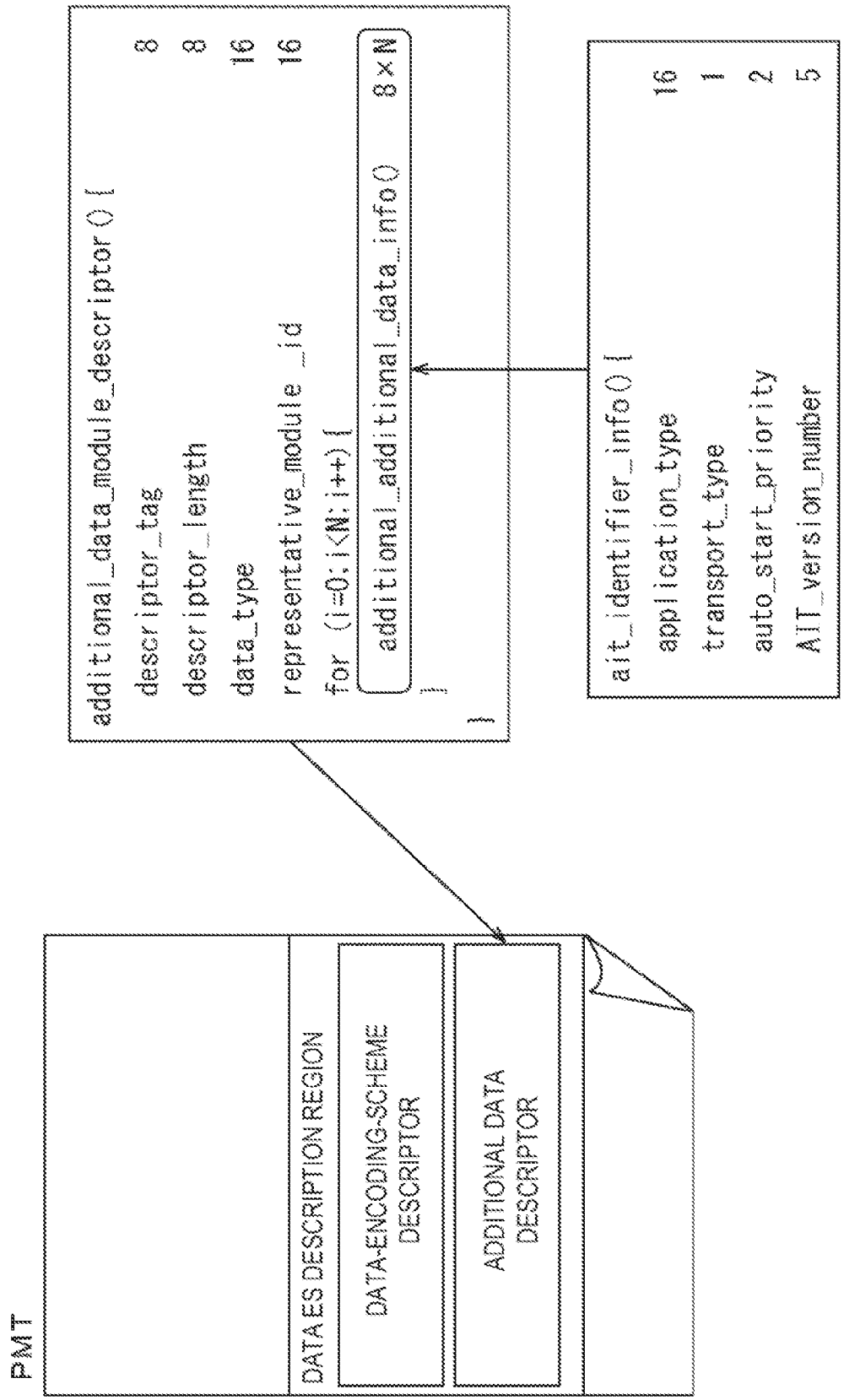
FIG. 10 is a drawing showing a description example of a PMT according to a first scheme.

FIG. 10 is a drawing showing a description example of a PMT according to the first scheme. As shown in FIG. 10, in the first scheme, in the PMT, information about the application control information is described by an additional data descriptor, which is different from the data-encoding-scheme descriptor.

If additional_data_module_descriptor( ) is described as the additional data descriptor, the following content is described.

As descriptor_tag, a tag value allocated to this descriptor is described. Also, as descritptor_length, a descriptor length of this descriptor is described.

As data_type, the type of the transmission data is described. If, for example, the application control information is transmitted by an AIT, the AIT is specified here. If other transmission data is to be transmitted, the type indicating the effect is described here.

As representative_module_id, identification information indicating by which module the transmission data specified by above-described data_type is transmitted is described. For example, if an AIT is specified as data_type, the transmission data is transmitted by the module of a particular module ID. However, since some of the transmission data is transmitted by a plurality of modules, in that case, a representative module ID is described as representative_module_id, and, as a result, corresponding modules are identified by this module ID.

Herein, an example in which only one representative module ID is specified is explained. However, if the transmission data is transmitted by a plurality of modules, a plurality of module IDs of the targets may be specified.

As additional_additional_data_info( ), data which is further added to the additional data is described. Therein, additional data corresponding to the transmission data specified by above-described data_type is described. For example, if AIT is specified by data_type, as shown in FIG. 10, ait_identifier_info( ) is described. As ait_identifier_info( ), the following content is described.

As application_type, the type of the linked application operated in accordance with the control commands is described. For example, if HTML 5 is specified as this type, an operation of activating and preparing a HTML browser in advance can be carried out in the reception apparatus 20.

As transport_type, information indicating by which type the AIT is transmitted is described. Since the AIT is transmitted as a file of an XML-form document in the data carousel transmission scheme in this case, 1-bit information indicating the effect is described.

A case in which the AIT is transmitted as a file of an XML-form document in the data carousel transmission scheme and, for example, a case in which the AIT is transmitted as binary data by a stream of AIT sections are expected. Therefore, in that case, 1-bit information indicating in which scheme of them it is transmitted is described.

As auto_start_priority, the value is described indicating the priority among the types of other application programs (in this case, including data-broadcast content) in a case in which the linked application is to be automatically activated (Auto Start) in accordance with the control command.

This value is specified by two bits. Therefore, for example, if the data-broadcast content consists of BML-form documents, the value of the priority of the BML is set to 0.5 as default; as a result, if the value of the priority of a target type is higher than 0.5, the priority thereof becomes higher than the BML-form documents, while the priority thereof becomes lower than the BML-form documents if lower than 0.5. If a plurality of types having higher priority than the BML-form documents are present, the application program of the type having the highest value of the priority thereof is automatically activated.

Note that the PMT is the information transmitted at a frequency of 100 msec or less and is obtained for example when a channel is selected. Therefore, the reception apparatus 20 can always obtain the value indicating this priority upon activation of the application program. Therefore, the reception apparatus 20 can instantly judge this priority upon activation of the application program and activate the application program of high priority.

As AIT_version_number, the version information on the AIT is described.

In the first scheme, the PMT is described in the above-described manner.

The description content of the additional data descriptor according to the first scheme is arbitrary and is not limited to the description example of FIG. 10.

(Application Control Process of First Scheme)

Next, an application control process according to the first scheme will be explained with reference to the flow chart of FIG. 11.

In step S101, the table obtaining/analyzing unit 112 obtains a PMT at predetermined timing such as upon channel selection.

In step S102, the table obtaining/analyzing unit 112 analyzes the obtained PMT and, according to representative_module_id described in the additional data descriptor, identifies the module ID of the module by which an AIT is transmitted.

In step S103, the carousel processing unit 110 starts monitoring of the module of the module ID identified by the PMT. Note that, upon monitoring of this module, a DII is obtained, and the monitoring of the module is carried out based on the obtained DII.

In step S104, the carousel processing unit 110 determines whether the target module has not been obtained or whether the target module has been updated. Herein, whether the target module has been updated is determined by whether the module version has been changed. In step S104, if it is determined that the target module has not been obtained or the target module has been updated, the process proceeds to step S105.

In step S105, the table obtaining/analyzing unit 112 analyzes auto_start_priority described in the obtained PMT and determines whether the priority of the linked application is higher than the priority of the data-broadcast content. In step S105, if it is determined that the priority of the linked application is higher than the priority of the data-broadcast content, the process proceeds to step S106.

In step S106, the carousel processing unit 110 rebuilds the module of the module ID identified by PMT and obtains the AIT.

In step S107, the application control unit 113 analyzes the application control information contained in the AIT and discriminates if the control command is Auto Start, Present, Kill or Prefetch.

In step S108, the application control unit 113 determines whether the discrimination result in step S107 is Prefetch. If Prefetch is determined in step S108, the process proceeds to step S109.

In step S109, in accordance with control from the application control unit 113, the communication I/F 114 accesses the application server 30 identified by the application URL and obtains the linked application. The linked application is retained in the memory 115. When step S108 is terminated, the process proceeds to step S116.

If it is determined in step S108 that the discrimination result in step S107 is not Prefetch, the process proceeds to step S110. In step S110, the application control unit 113 determines whether the discrimination result in step S107 is Auto Start. If it is determined in step S110 that the discrimination result in step S107 is Auto Start, the process proceeds to step S111.

In step S111, if the linked application identified by the application ID has not been obtained (not present in the memory 115), the application control unit 113 obtains it.

In step S112, the application control unit 113 obtains the linked application, which is identified by the application ID, from the memory 115 and activates it. When step 112 is terminated, the process proceeds to step S116.

If it is determined in step S110 that the discrimination result in step S107 is not Auto Start, the process proceeds to step S113.

In step S113, the application control unit 113 determines whether the discrimination result in step S107 is Kill. If it is determined in step S113 that the discrimination result in step S107 is Kill, the process proceeds to step S114.

In step S114, if the linked application, which is identified by the application ID, is being executed, the application control unit 113 terminates it. When step S114 is terminated, the process proceeds to step S116.

If it is determined in step S113 that the discrimination result in step S107 is not Kill, the discrimination result in step S107 is Present. Therefore, the process proceeds to step S115.

In step S115, the application control unit 113 stores the application ID serving as a target. By virtue of this, the linked application of the application ID serving as the target is executed at arbitrary timing. When step S115 is terminated, the process proceeds to step S116.

In step S116, the application control unit 113 determines whether all the processes described in the AIT have been terminated. If it is determined in step S116 that the processes have not been terminated, the process returns to step S107, and the processes thereafter are repeated. If it is determined in step S116 that the processes have been terminated, the process returns to step S103, and the processes thereafter are repeated.

Note that, if it is determined in step S105 that the priority of the linked application is lower than the priority of the data-broadcast content, the process proceeds to step S117. Then, in step S117, it is determined whether the data-broadcast content transmitted in the data carousel transmission scheme is present. If the data-broadcast content is present, it is obtained and activated (S118).

Hereinabove, the explanation of the application control process according to the first scheme is terminated.

In the application control process according to the first scheme, the linked application can be activated or terminated in conjunction with, for example, a TV program or the like. In the case of the first scheme, the module by which the AIT is transmitted is identified by representative_module_id described in the additional data descriptor of the PMT.

Note that, in the first scheme, the module by which the AIT is transmitted may be identified by using the module ID specified by the DII. However, if the production environments of the linked application and the data-broadcast content are different, it is more suitable to identify the module by representative_module_id in terms of clear distinguishment of the boundary of the environments thereof.

(Second Scheme)

Figure 13:
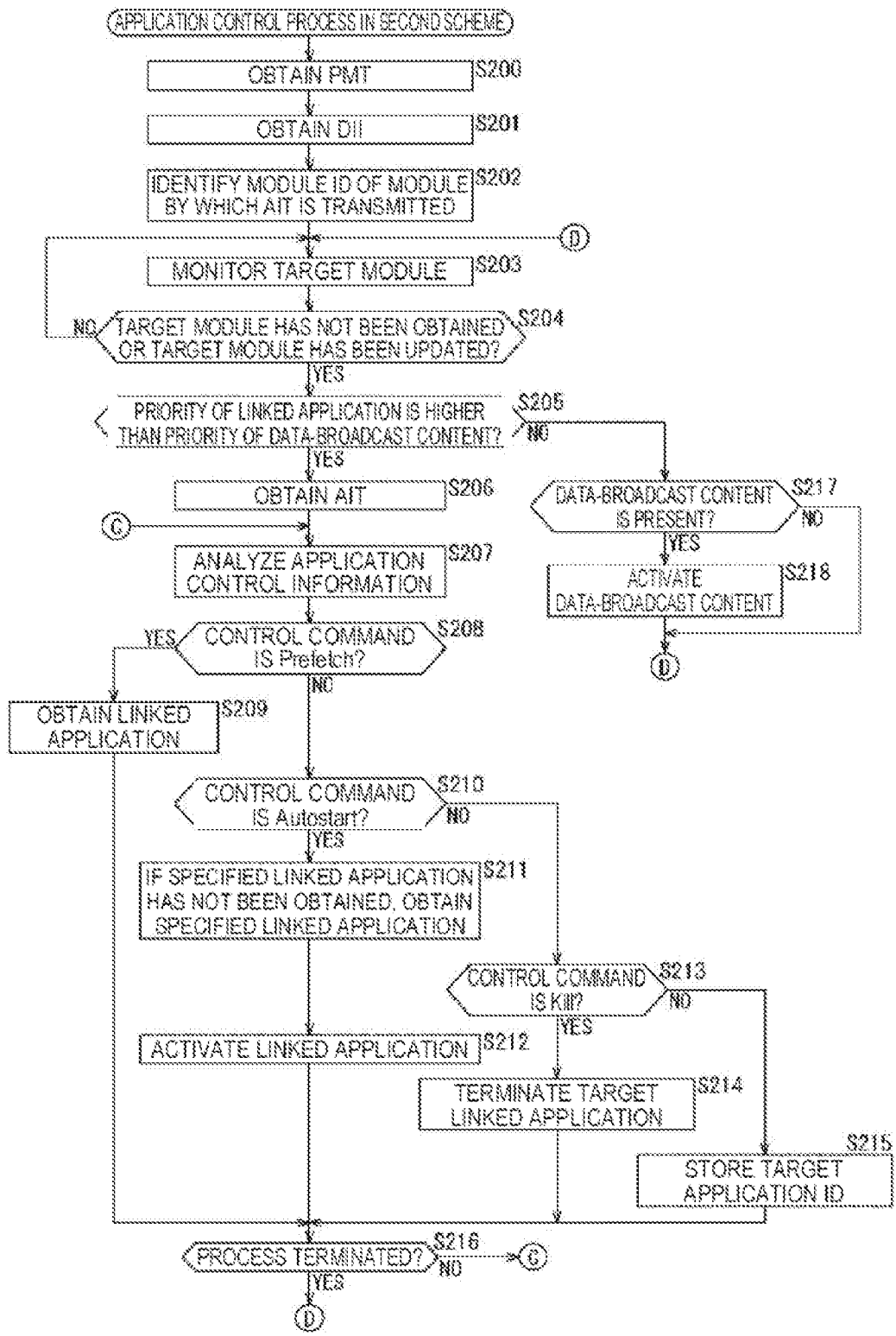
FIG. 13 is a flow chart explaining an application control process according to the second scheme.

Next, the second scheme will be explained with reference to FIG. 12 and FIG. 13.

FIG. 12 is a drawing showing a description example of the PMT according to the second scheme. As shown in FIG. 12, in the second scheme, in the PMT, the information about the application control information is described in the reserve region of the data-encoding-scheme descriptor.

In the reserve region of the data-encoding-scheme descriptor, the following content is described.

As additional_default_ait_info_indicator, the information indicating whether a default AIT is transmitted is described. For example, if "0" is specified as additional_default_ait_info_indicator, this indicates that an AIT for a linked application consisting of an HTML 5 form document is transmitted in the data carousel transmission scheme.

If "0" is specified as additional_default_ait_info_indicator, the priority of automatic activation (Auto start) of the type of the linked application with respect to the type of the data-broadcast content is described as default_auto_start_priority_flag. For example, if "0" is specified as default_auto_start_priority_flag, this indicates that HTML 5 form documents have higher priority than BML-form documents.

If an AIT other than the AIT of default is specified, "0" is described as non_default_ait_info_indicator. More specifically, the AIT is basically transmitted in the data carousel transmission scheme as an AIT for a linked application consisting of an HTML 5 form document; however, a possibility of an AIT other than the AIT of default being transmitted is also expected. Therefore, in preparation for future expansion, if "0" is specified as non_default_ait_info_indicator, an AIT other than that of default is to be transmitted. Therefore, information about this AIT is described thereafter.

If the AIT other than that of default is to be transmitted, the number of the scheme(s) thereof is described as non_default_ait_info_number. If the AIT other than that of default is to be transmitted, additional_ait_info( ) is described in accordance with the number of the schemes.

As additional_ait_info( ), ait_identifier_info( ) is described, and the content thereof is similar to that of ait_identifier_info( ) of the first scheme of FIG. 10. Therefore, the explanation thereof is omitted.

In the second scheme, the PMT is described in the above-described manner.

Note that the description content of the reserve region of the data-encoding-scheme descriptor according to the second scheme is arbitrary, and is not limited to the description example of FIG. 12.

(Application Control Process of Second Scheme)

Next, an application control process according to the second scheme will be explained with reference to the flow chart of FIG. 13.

In step S200, the table obtaining/analyzing unit 112 obtains a PMT at predetermined timing such as upon channel selection. In step S201, the carousel processing unit 110 obtains a DII transmitted in the data carousel transmission scheme.

In step S202, according to the module ID specified by the DII, the carousel processing unit 110 identifies the module ID of a module by which an AIT is transmitted. Note that, when the information indicating the AIT is identified as a content type in the module unit information on the DII, the module ID of the module by which the AIT is transmitted can be specified according to this information.

Figure 11:
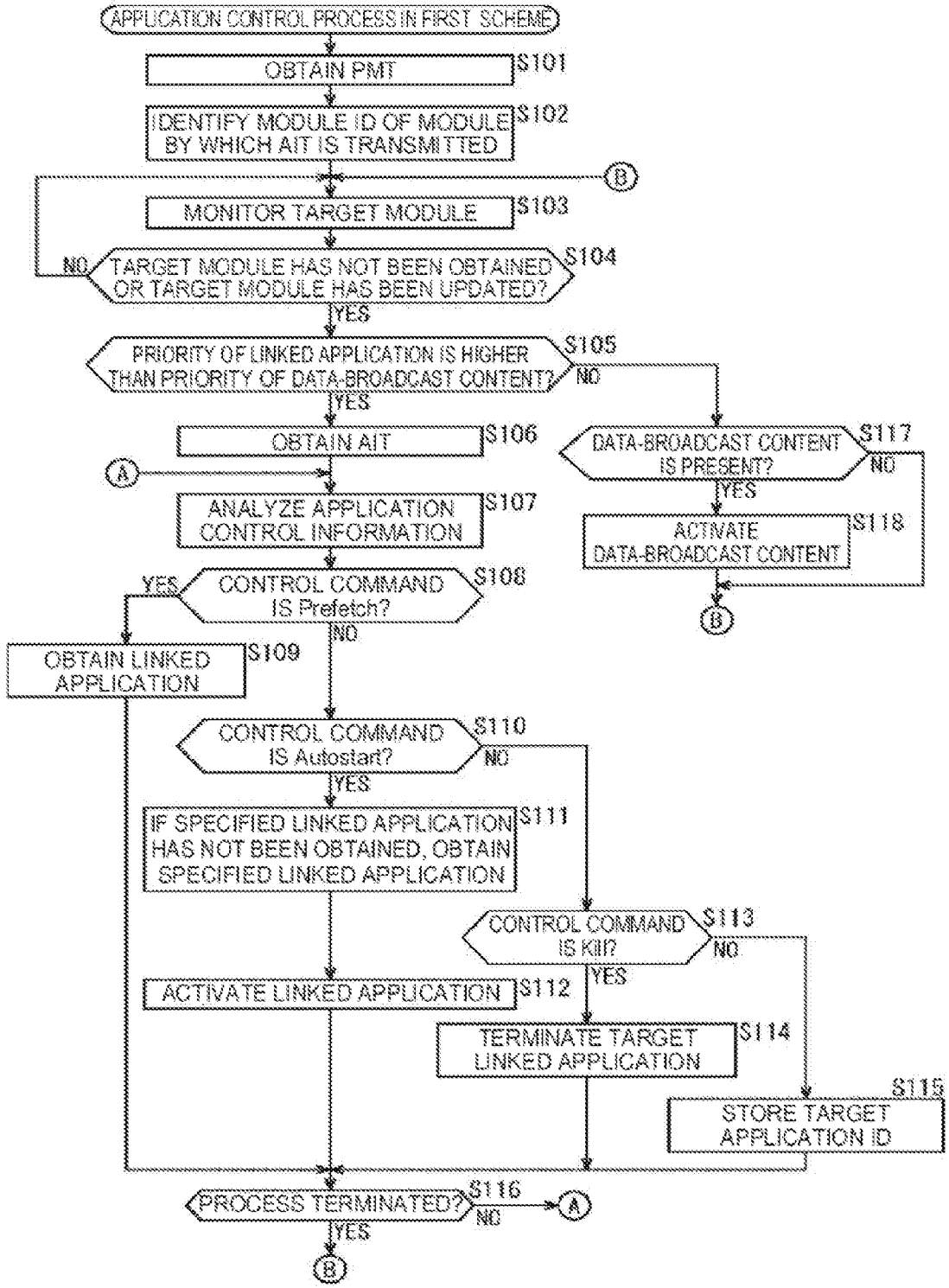
FIG. 11 is a flow chart explaining an application control process according to the first scheme.

In steps S203 to S218, as well as steps S103 to S118 of FIG. 11, if the target module has not been obtained or the target module has been updated, the AIT transmitted by the target module is obtained, and an operation corresponding to the control command contained in the application control information is carried out. If "0" is specified as default_auto_start_priority_flag described in the PMT, the priority of the linked application is higher than the priority of the data-broadcast content; and therefore, activation of the linked application is prioritized.

Hereinabove, the explanation of the application control process according to the second scheme has been terminated.

In the application control process according to the second scheme, the linked application can be activated or terminated in conjunction with, for example, a TV program. In the case of the second scheme, since the module ID cannot be identified by the PMT, the module by which the AIT is transmitted is identified by referencing the DII.

As described above, according to the present techniques, by using the data carousel transmission scheme, by transmitting the application control information, the linked application can be operated in conjunction with a TV program or the like.

The provider side such as a broadcasting station desires employment of a scheme that reduces cost burden and operation risks as much as possible by introducing a new transmitting apparatus. If the present techniques are employed, the application control information can be transmitted by utilizing the existing data carousel transmission scheme. Therefore, the cost burden and operation risks can be reduced.

In the above-described explanations, the application control information has been explained as the transmission data transmitted in the data carousel transmission scheme. However, it is not limited thereto, and, for example, various data such as music data and data of electronic books can be transmitted as the transmission data.

[Configuration Example of Computer to which Present Technology is Applied]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 14:
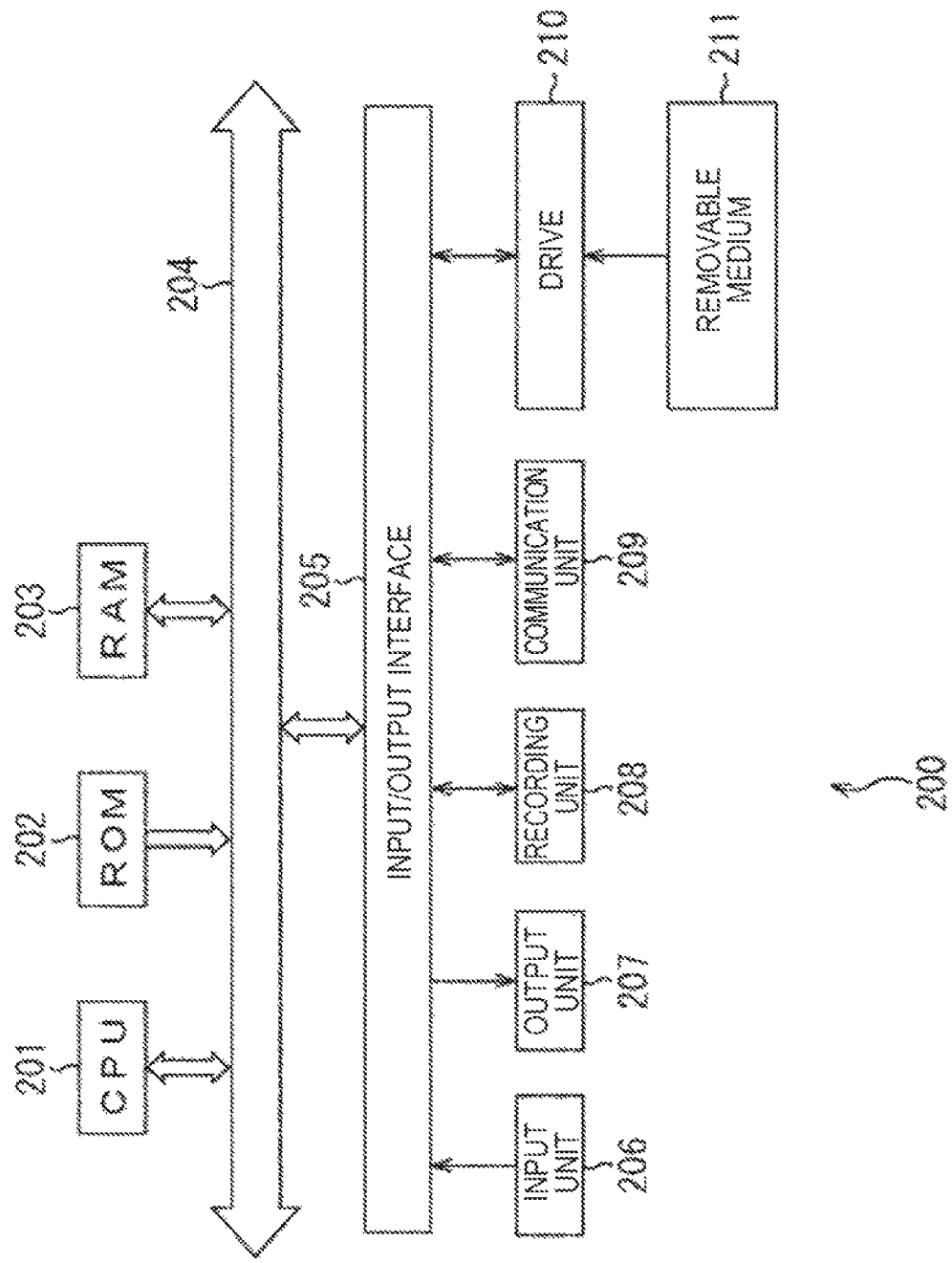
FIG. 14 is a drawing showing a configuration example of a computer.

FIG. 14 is a block diagram showing a hardware configuration example of a computer that performs the above-described series of processing using a program.

In the computer 200, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a recording unit 208, a communication unit 209, and a drive 210 are connected to the input/output interface 205.

The input unit 206 is configured from a keyboard, a mouse, a microphone or the like. The output unit 207 is configured from a display, a speaker or the like. The recording unit 208 is configured from a hard disk, a non-volatile memory or the like. The communication unit 209 is configured from a network interface or the like. The drive 210 drives a removable medium 211 such as a magnetic disk, an optical disk, a magneto-optical disk, a semiconductor memory or the like.

In the computer 200 configured as described above, the CPU 201 loads a program that is stored, for example, in the recording unit 208 onto the RAM 203 via the input/output interface 205 and the bus 204, and executes the program. Thus, the above-described series of processing is performed.

Programs to be executed by the computer 200 (the CPU 201) are provided being recorded in the removable medium 211 which is a packaged medium or the like. Also, programs may be provided via a wired or wireless transmission medium, such as a local area network, the Internet or digital satellite broadcasting.

In the computer 200, by loading the removable medium 211 into the drive 210, the program can be installed into the recording unit 208 via the input/output interface 205. It is also possible to receive the program from a wired or wireless transfer medium using the communication unit 209 and install the program into the recording unit 208. As another alternative, the program can be installed in advance into the ROM 202 or the recording unit 208.

It should be noted that the program executed by a computer 200 may be a program that is processed in time series according to the sequence described in this specification or a program that is processed in parallel or at necessary timing such as upon calling.

Here, in the present specification, processing steps that describe the program causing the computer 200 to execute various processes may not necessarily be processed in time series in the order prescribed as a flowchart, but include processes (for example, parallel processes or processes by objects) performed in parallel or individually.

The program may be a program executed by a single computer or may be a program executed in a distribution manner by a plurality of computers. The program may be transmitted remotely to a computer to be executed.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Note that the present techniques can have configurations below.

(1)

A reception apparatus having:

a reception unit that receives broadcast content transmitted by broadcast waves of digital broadcasting;

a first obtaining unit that obtains transmission data that is transmitted in a data carousel transmission scheme by the broadcast waves and is other than the data-broadcast content; and a control unit that controls a predetermined operation based on the obtained transmission data.

(2)

The reception apparatus according to (1), wherein the transmission data is control information for controlling an operation of an application program executed in conjunction with the broadcast content; and the control unit controls the operation of the application program distributed via a network in accordance with the control information.

(3)

The reception apparatus according to (2), further having a second obtaining unit that obtains identification information on a module for transmitting the control information described in an additional data descriptor different from a data-encoding-scheme descriptor in a data elementary stream description region of a PMT (Program Map Table) transmitted by the broadcast waves; wherein the first obtaining unit obtains the control information from the module identified by the obtained identification information.

(4)

The reception apparatus according to (3), wherein information indicating a type of the transmission data is described as the additional data descriptor.

(5)

The reception apparatus according to (4), wherein, if the control information is specified as the type, the control unit controls the operation of the application program in accordance with set content described as the additional data descriptor.

(6)

The reception apparatus according to (4) or (5), wherein, if the control information is specified as the type, information indicating a transmission scheme of the control information is described as additional information as the additional data descriptor.

(7)

The reception apparatus according to any of (5) to (7), wherein, if the control information is specified as the type, information indicating priority of activation between the application program and the data-broadcast content is described as additional information as the additional data descriptor.

(8)

The reception apparatus according to (2), wherein the first obtaining unit obtains identification information on a module for transmitting the control information obtained from a DII (Download Info Indication) storing directory information on a DDB (Download Data Block) in the data carousel transmission scheme and obtains the control information from the module identified by the obtained identification information.

(9)

The reception apparatus according to (8), wherein, if the control information specified as default and described in a reserve region of a data-encoding-scheme descriptor in a data elementary stream description region of a PMT (Program Map Table) transmitted by the broadcast waves is transmitted, the control unit controls the operation of the application program in accordance with set content determined in advance.

(10)

The reception apparatus according to (9), wherein, when the control information specified as the default is not transmitted, information indicating a transmission scheme of the control information is described as additional information in the reserve region.

(11)

The reception apparatus according to (9) or (10), wherein, when the control information specified as the default is not transmitted, information indicating priority of activation between the application program and the data-broadcast content is described as additional information in the reserve region.

(12)

A reception method of a reception apparatus, the reception method including:

a step of receiving, by the reception apparatus, broadcast content transmitted by a broadcast wave of digital broadcasting;

a step of obtaining, by the reception apparatus, transmission data other than data-broadcast content, is the transmission data being transmitted in a data carousel transmission scheme by the broadcast wave; and a step of controlling, by the reception apparatus, a predetermined operation based on the obtained transmission data.

(13)

A program for causing a computer to function as:

a reception unit that receives broadcast content transmitted by a broadcast wave of digital broadcasting;

a first obtaining unit that obtains transmission data other than data-broadcast content, the transmission data being transmitted in a data carousel transmission scheme by the broadcast wave; and a control unit that controls a predetermined operation based on the obtained transmission data.

(14)

A transmission apparatus including:

a first transmission unit that transmits broadcast content transmitted by a broadcast wave of digital broadcasting; and a second transmission unit that transmits transmission data other than data-broadcast content, the transmission data being transmitted in a data carousel transmission scheme by the broadcast wave.

(15)

A transmission method of a transmission apparatus, the transmission method including:

a step of transmitting, by the transmission apparatus, broadcast content transmitted by a broadcast wave of digital broadcasting; and a step of transmitting, by the transmission apparatus, transmission data other than data-broadcast content, the transmission data being transmitted in a data carousel transmission scheme by the broadcast wave.

REFERENCE SIGNS LIST 1 broadcast system
10 broadcast apparatus
20 reception apparatus
30 application server
40 Internet
101 control unit
103 tuner
110 carousel processing unit
111 data-broadcast control unit
112 table obtaining/analyzing unit
113 application control unit
114 communication I/F
115 memory
200 computer
201 CPU

The invention claimed is:

1. A reception apparatus comprising:
one or more receivers configured to:
receive broadcast content transmitted using digital broadcasting; and one or more processors configured to:
    obtain transmission data other than data-broadcast content, the transmission data being transmitted in a data carousel transmission scheme using the digital broadcasting, wherein the transmission data corresponds to control information for controlling an operation of an application program to be executed, by the one or more processors, in conjunction with the broadcast content;
    obtain identification information on a module for transmitting the control information, the identification information being described in an additional data descriptor different from a data-encoding-scheme descriptor in a data elementary stream description region of a PMT (Program Map Table) transmitted using the digital broadcasting, wherein the control information is obtained from the module identified by the obtained identification information; and
    control the operation of the application program distributed via a network in accordance with the control information.

2. The reception apparatus according to claim 1, wherein information indicating a type of the transmission data is described in the additional data descriptor.

3. The reception apparatus according to claim 2, wherein, when the control information is specified as the type, the one or more processors control the operation of the application program in accordance with set content described in the additional data descriptor.

4. The reception apparatus according to claim 3, wherein, when the control information is specified as the type, information indicating a transmission scheme of the control information is described as additional information in the additional data descriptor.

5. The reception apparatus according to claim 3, wherein, when the control information is specified as the type, information indicating priority of activation between the application program and the data-broadcast content is described as additional information in the additional data descriptor.

6. A reception apparatus comprising:
  one or more receivers configured to:
    receive broadcast content transmitted using digital broadcasting; and
  one or more processors configured to:
    obtain transmission data other than data-broadcast content, the transmission data being transmitted in a data carousel transmission scheme using the digital broadcasting, wherein the transmission data corresponds to control information for controlling an operation of an application program to be executed, by the one or more processors, in conjunction with the broadcast content;
    obtain identification information on a module for transmitting the control information obtained from a DII (Download Info Indication) storing directory information on a DDB (Download Data Block) in the data carousel transmission scheme; and
    obtain the control information from the module identified by the obtained identification information, wherein when the control information is specified as a default and described in a reserve region of a data-encoding-scheme descriptor in a data elementary stream description region of a PMT (Program Map Table) transmitted using the digital broadcasting, the one or more processors control the operation of the application program in accordance with set content determined in advance.

7. The reception apparatus according to claim 6, wherein, when the control information specified as the default is not transmitted, information indicating a transmission scheme of the control information is described as additional information in the reserve region.

8. The reception apparatus according to claim 6, wherein, when the control information specified as the default is not transmitted, information indicating priority of activation between the application program and the data-broadcast content is described as additional information in the reserve region.

9. A reception method of a reception apparatus, the reception method comprising:
  receiving, by the reception apparatus, broadcast content transmitted using digital broadcasting;
  obtaining, by the reception apparatus, transmission data other than data broadcast content, the transmission data being transmitted in a data carousel transmission scheme using the digital broadcasting wherein the transmission data corresponds to control information for controlling an operation of an application program to be executed, by the one or more processors, in conjunction with the broadcast content;
  obtaining, by the reception apparatus, identification information on a module for transmitting the control information, the identification information being described in an additional data descriptor different from a data-encoding-scheme descriptor in a data elementary stream description region of a PMT (Program Map Table) transmitted using the digital broadcasting, wherein the control information is obtained from the module identified by the obtained identification information; and
  controlling, by the reception apparatus, the operation of the application program distributed via a network in accordance with the control information.

10. A non-transitory computer-readable storage medium, having stored thereon a set of computer-executable instructions for causing a computer to perform the steps comprising:
  receiving broadcast content transmitted using digital broadcasting;
  obtaining transmission data other than data-broadcast content, the transmission data being transmitted in a data carousel transmission scheme using the digital broadcasting wherein the transmission data corresponds to control information for controlling an operation of an application program to be executed in conjunction with the broadcast content;
  obtaining identification information on a module for transmitting the control information, the identification information being described in an additional data descriptor different from a data-encoding-scheme descriptor in a data elementary stream description region of a PMT (Program Map Table) transmitted using the digital broadcasting, wherein the control information is obtained from the module identified by the obtained identification information; and
  controlling the operation of the application program distributed via a network in accordance with the control information.

11. A transmission apparatus comprising:
  one or more transmitters configured to:
    transmit broadcast content using digital broadcasting; and
    transmit transmission data other than data-broadcast content, the transmission data being transmitted in a data carousel transmission scheme using the digital broadcasting, wherein the transmission data corresponds to control information for controlling an operation of an application program to be executed, by a reception apparatus, in conjunction with the broadcast content, wherein identification information on a module for transmitting the control information is described in an additional data descriptor different from a data-encoding-scheme descriptor in a data elementary stream description region of a PMT (Program Map Table) transmitted using the digital broadcasting.

12. A transmission method of a transmission apparatus, the transmission method comprising:

transmitting, by the transmission apparatus, broadcast content using digital broadcasting; and transmitting, by the transmission apparatus, transmission data other than data-broadcast content, the transmission data being transmitted in a data carousel transmission scheme using the digital broadcasting, wherein the transmission data corresponds to control information for controlling an operation of an application program to be executed, by a reception apparatus, in conjunction with the broadcast content, wherein identification information on a module for transmitting the control information is described in an additional data descriptor different from a data-encoding-scheme descriptor in a data elementary stream description region of a PMT (Program Map Table) transmitted using the digital broadcasting.

* * * * *